(12) United States Patent
Johnson et al.

(10) Patent No.: US 11,893,273 B2
(45) Date of Patent: Feb. 6, 2024

(54) CRASH-SAFE TIERED MEMORY SYSTEM

(71) Applicant: VMware, Inc., Palo Alto, CA (US)

(72) Inventors: Robert T. Johnson, Scotts Valley, CA (US); Alexander John Horton Conway, Palo Alto, CA (US); Yi Xu, La Jolla, CA (US); Aishwarya Ganesan, Madison, WI (US); Ramnatthan Alagappan, Madison, WI (US)

(73) Assignee: VMware, Inc., Palo Alto, CA (US)

( * ) Notice: Subject to any disclaimer, the term of this patent is extended or adjusted under 35 U.S.C. 154(b) by 56 days.

(21) Appl. No.: 17/580,154

(22) Filed: Jan. 20, 2022

(65) Prior Publication Data
US 2023/0229346 A1 Jul. 20, 2023

(51) Int. Cl.
*G06F 3/06* (2006.01)
(52) U.S. Cl.
CPC .......... *G06F 3/0656* (2013.01); *G06F 3/0619* (2013.01); *G06F 3/0679* (2013.01)
(58) Field of Classification Search
CPC ..... G06F 3/0656; G06F 3/0619; G06F 3/0679
See application file for complete search history.

(56) References Cited

U.S. PATENT DOCUMENTS

| | | | | |
|---|---|---|---|---|
| 2010/0106896 A1* | 4/2010 | Bildgen | ............... | G06F 11/1441 711/E12.001 |
| 2014/0082310 A1* | 3/2014 | Nakajima | ............. | G06F 12/023 711/E12.103 |
| 2014/0122780 A1* | 5/2014 | Smith | ................. | G06F 11/1441 711/103 |
| 2014/0136767 A1* | 5/2014 | Lee | ...................... | G06F 12/0246 711/103 |
| 2016/0080491 A1* | 3/2016 | Sykes | ...................... | H04L 67/01 709/219 |
| 2018/0067660 A1* | 3/2018 | Yamamoto | ............ | G06F 3/0641 |
| 2020/0159419 A1* | 5/2020 | Li | ............................ | G06F 3/068 |
| 2021/0132862 A1* | 5/2021 | Gong | .................... | G06F 3/0689 |
| 2022/0179799 A1* | 6/2022 | Erickson | ............. | G06F 12/0804 |

* cited by examiner

*Primary Examiner* — Nanci N Wong
(74) *Attorney, Agent, or Firm* — Kim & Stewart LLP

(57) ABSTRACT

A method of writing to a tiered memory system of a computing device, the tiered memory system including volatile memory and persistent memory (PMEM), includes the steps of: in response to a first write request including first data to write to a first page of the tiered memory system, copying contents of the first page to a second page located in the PMEM; after copying the contents of the first page to the second page, writing the first data to the second page; and after writing the first data to the second page, updating a first mapping of the tiered memory system to reference the second page instead of the first page.

20 Claims, 8 Drawing Sheets

| Transaction Table 162 | | | | |
|---|---|---|---|---|
| App. IDs 180 | Original Page Numbers 182 | New Page Numbers 184 | Released Flags 186 | Complete Flags 188 |
| J | 0, 1, 50 | 52, 53, 54 | 1, 1, 1 | 1 |
| K | 2, 51 | 55, 56 | 0, 0 | 0 |
| ⋮ | | | | |

| Transaction Table 162 | | | | |
|---|---|---|---|---|
| App. IDs 180 | Original Page Numbers 182 | New Page Numbers 184 | Released Flags 186 | Complete Flags 188 |
| J | 0, 1, 50 | 52, 53, 54 | 1, 1, 1 | 1 |
| K | 2, 51 | 55, 56 | 0, 0 | 0 |
| ⋮ | | | | |

Time 0

| DRAM 150 | |
|---|---|
| Page | Data |
| 0 | A |
| 1 | B |
| ⋮ | |

| PMEM 160 | |
|---|---|
| Page | Data |
| 50 | X |
| ⋮ | |

| Storage 170 | |
|---|---|
| Block | Data |
| 0 | A |
| 1 | B |
| 2 | W |
| ⋮ | |

Figure 2A

Time 1: Evict data at page 1 in DRAM to PMEM

| DRAM 150 | |
|---|---|
| Page | Data |
| 0 | A |
| --- | --- |
| ⋮ | |

| PMEM 160 | |
|---|---|
| Page | Data |
| 50 | X |
| 51 | B |
| ⋮ | |

| Storage 170 | |
|---|---|
| Block | Data |
| 0 | A |
| 1 | B |
| 2 | W |
| ⋮ | |

Figure 2B

Time 2: Promote data at page 0 in PMEM to DRAM (Step 1: Back up to storage)

Time 3: Promote data at page 0 in PMEM to DRAM (Step 2: Copy to DRAM)

Time 0

Time 1: Perform write request directed to page 1 in DRAM (Step 1: Copy to PMEM)

Time 2: Perform write request directed to page 1 in DRAM (Step 2: Write to copy)

Time 3: Perform write request directed to page 0 in PMEM (Step 1: Copy within PMEM)

| DRAM 150 | |
|---|---|
| Page | Data |
| 0 | C |
| 1 | DE |
| ⋮ | |

| PMEM 160 | |
|---|---|
| Page | Data |
| 50 | XY |
| 51 | DF |
| 52 | XY |
| ⋮ | |

Figure 3D

Time 4: Perform write request directed to page 0 in PMEM (Step 2: Write to copy)

| DRAM 150 | |
|---|---|
| Page | Data |
| 0 | C |
| 1 | DE |
| ⋮ | |

| PMEM 160 | |
|---|---|
| Page | Data |
| 50 | XY |
| 51 | DF |
| 52 | ZY |
| ⋮ | |

Figure 3E

CRASH-SAFE TIERED MEMORY SYSTEM

BACKGROUND

Traditionally, a hardware platform of a computing device includes a storage device such as a hard disk drive (HDD) or solid-state drive (SSD) along with volatile memory such as static or dynamic random-access memory (RAM). The storage device stores long-term data persistently such that the data remains in the event of, e.g., a power outage or crash. The volatile memory stores short-term data that is non-persistent, the volatile memory providing fast performance of read and write requests.

Recently, several persistent memory (PMEM) technologies have been developed that offer advantages over volatile memory. PMEM is cheaper than volatile memory, and like with storage, data in PMEM is persistent. However, although faster than storage devices, PMEM is slower than volatile memory. Merely replacing volatile memory with PMEM thus has performance drawbacks. Accordingly, some hybrid memory systems have been built that include both PMEM and volatile memory as separate tiers of memory. Such tiered memory systems offer benefits such as providing more memory space than volatile memory can provide alone, at a given price. However, such memory systems have been limited in various respects. For example, the data stored in the volatile memory of such a memory system is only periodically persisted in storage, creating a high risk of data loss in the event of a crash. An efficient, crash-safe memory system that takes advantage of both PMEM and volatile memory is desired.

SUMMARY

Embodiments provide a tiered memory system in which changes are instantly persisted. Such persistence is accomplished through copy-on-write execution of write requests into PMEM regardless of whether such write requests are directed to data in PMEM or to data in volatile memory. Accordingly, one or more embodiments provide a method of writing to a tiered memory system of a computing device, the tiered memory system including volatile memory and PMEM. The method includes the steps of: in response to a first write request including first data to write to a first page of the tiered memory system, copying contents of the first page to a second page located in the PMEM; after copying the contents of the first page to the second page, writing the first data to the second page; and after writing the first data to the second page, updating a first mapping of the tiered memory system to reference the second page instead of the first page.

Further embodiments include a non-transitory computer-readable storage medium comprising instructions that cause a computer system to carry out the above method, as well as a computing device configured to carry out the above method.

BRIEF DESCRIPTION OF THE DRAWINGS

FIGS. 2A-2D are a sequence of system diagrams illustrating a tiered memory system and storage as data is evicted from volatile memory to PMEM and promoted from PMEM to volatile memory.

FIGS. 3A-3E are a sequence of system diagrams illustrating the tiered memory system executing a write request directed to data in volatile memory and a write request directed to data in PMEM.

DETAILED DESCRIPTION

Figures 1A, 1B:
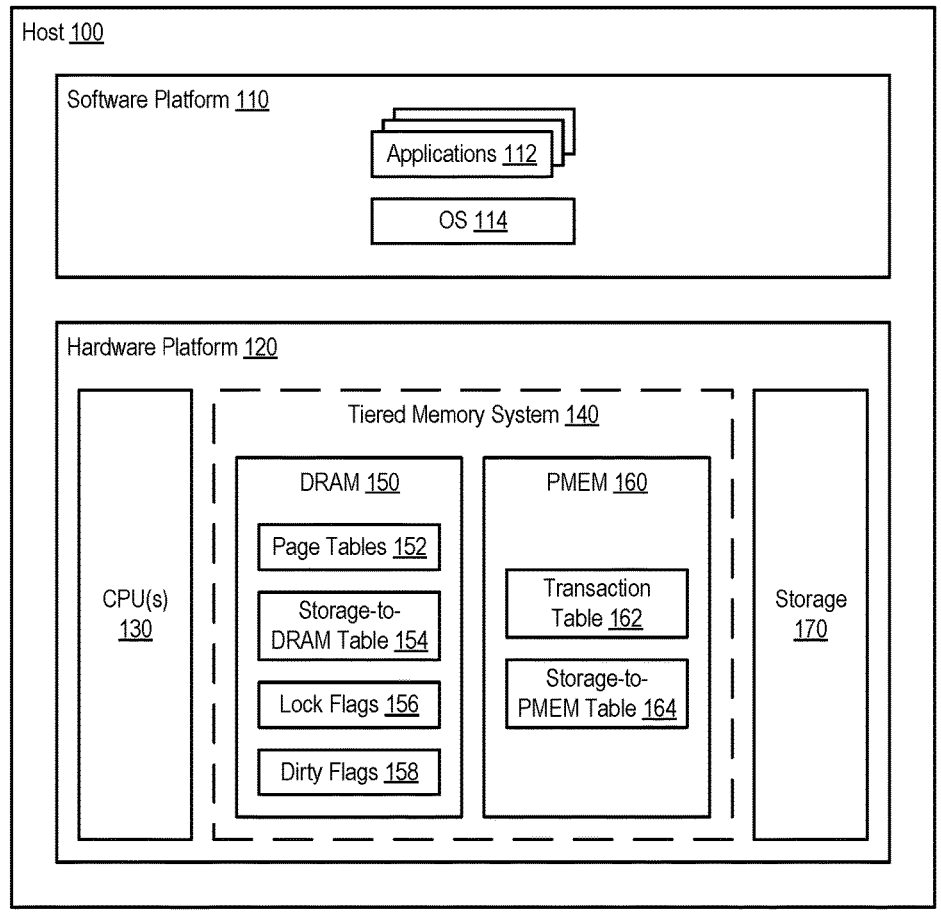
FIG. 1A is a block diagram of a host computing device in which embodiments may be implemented.
FIG. 1B is a block diagram of a transaction table for tracking write requests of transactions, according to embodiments.

Techniques for writing to a tiered memory system of a host computing device including both volatile memory and PMEM are described. The techniques involve receiving a write request from an application including data to write to a memory page of either volatile memory or PMEM. In response, an operating system (OS) of the host copies the contents of the page to a new page located in PMEM, locks the original page from read and write access, and writes to the new page. As the OS executes the write request, it thus leaves the original page intact.

The application can group write requests together as a single update, such an update referred to herein as a "transaction." For example, the application can use a transaction to update data of a memory page as a first write and related metadata as a second write. To group such write requests together, the application issues a series of write requests to a group of target memory pages followed by a series of unlock requests for each of the target memory pages. The transaction remains incomplete until the application explicitly issues unlock requests for all the target memory pages of the transaction. The application can alternatively declare that a write request can be executed independently of other write requests, also referred to herein as a "non-transaction."

By default, if the application issues a write request without declaring a non-transaction, the OS infers that the write request is part of a transaction along with earlier and/or later write requests. Accordingly, the OS performs transactional overhead to ensure that either all or none of the write requests of the transaction are completed. If the host crashes after the OS executes only a subset, the executed write requests are disregarded to avoid an inconsistent memory state. After executing all the write requests of a transaction or the single write request of a non-transaction, the OS "commits" the write request(s). The OS commits the write request(s) by updating both a storage-to-PMEM table and page tables.

One way to handle transactional overhead is to log the goal of a transaction before its constituent write requests are executed. Such logging is used in systems such as journaling file systems. However, logging such changes would introduce significant overhead that would diminish the performance of transactions. Instead, the transactional overhead of a write request according to embodiments merely involves updating metadata of a transaction table such as the memory address of the page targeted by the write request and the memory address of the new page at which the write is performed. Updating such metadata requires significantly less overhead than logging the goal of a transaction, the goal including user data in addition to metadata.

With both transactions and non-transactions, by copying contents of pages to PMEM and performing write requests on copies, writes are made instantly durable. As such, the techniques avoid the memory loss issue caused by volatile memory only periodically being backed up to storage. If the OS completes a transaction or non-transaction before a power outage or crash, including updating the storage-to-PMEM table, then both the written data and updated mappings remain. On the other hand, if the OS does not complete a transaction or non-transaction in time, the original page(s) are intact and remain available in either PMEM or storage. The memory system is thus crash-safe along with mitigating the risk of data loss. These and further aspects of the invention are discussed below with respect to the drawings.

FIG. 1A is a block diagram of a host computing device 100 in which embodiments may be implemented. Host 100 is constructed on a server grade hardware platform 120 such as an x86 architecture platform. Hardware platform 120 supports a software platform 110, which includes an OS 114 on which various applications 112 execute.

Hardware platform 120 includes one or more central processing units (CPUs) 130, a tiered memory system 140, and local storage 170 such as an HDD or SSD. CPU(s) 130 are configured to execute instructions such as executable instructions that perform one or more operations described herein, which may be stored in dynamic random-access memory (DRAM) 150. Tiered memory system 140 includes DRAM 150 and PMEM 160. Storage 170 includes files of applications 112 that are stored in units such as 1-MB data blocks. Storage 170 may also optionally be aggregated and provisioned as a virtual storage area network (vSAN).

CPU(s) 130 support "paging" of DRAM 150 and PMEM 160. Paging provides a virtual address space that is divided into pages, each page being an individually addressable unit of memory. Each page further includes a plurality of separately addressable data words, each of which includes one or more bytes of data. Pages are identified by addresses referred to as "page numbers." DRAM 150 and PMEM 160 can each support multiple page sizes including 4-KB, 2-MB, and 1-GB page sizes. Although embodiments are described with respect to DRAM 150, the embodiments apply to other volatile memory technologies including static random-access memory (SRAM).

DRAM 150 includes page tables 152, storage-to-DRAM table 154, lock flags 156, and dirty flags 158. Page tables 152 store references to physical addresses of DRAM 150 and PMEM 160. Specifically, one of applications 112 may issue a read or write request to one of DRAM 150 and PMEM 160, the request specifying a virtual address of application 112's virtual address space. Page tables 152 corresponding to application 112 map the virtual address to a physical address of DRAM 150 or PMEM 160.

Storage-to-DRAM table 154 includes mappings between addresses of storage 170 and DRAM 150. Lock flags 156 indicate whether pages located in DRAM 150 or PMEM 160 are locked from read and write access. Dirty flags 158 indicate whether updates made to pages located in DRAM 150 or PMEM 160 have been persisted in storage 170. Because writing to storage 170 is relatively slow, such updates are only periodically backed up to storage 170 in batches.

PMEM 160 includes a transaction table 162 and storage-to-PMEM table 164. Transaction table 162, which is discussed further below in conjunction with FIG. 1B, includes metadata of transactions of applications 112. Storage-to-PMEM table 164 includes mappings between addresses of storage 170 and PMEM 160. Such mappings are used for locating data stored in PMEM 160 when booting up host 100.

FIG. 1B is a block diagram of transaction table 162, according to embodiments. The example of FIG. 1B includes two transactions, a first transaction for an application "J" and a second transaction for an application "K." Transaction table 162 includes application IDs 180 for identifying which application 112 an entry of transaction table 162 corresponds to. Transaction table 162 further includes original page numbers 182, new page numbers 184, released flags 186, and complete flags 188.

Original page numbers 182 correspond to pages located in DRAM 150 and PMEM 160 that applications 112 have issued requests to write to. For example, in the first transaction, application "J" issued write requests targeting portions of pages 0 and 1, which are in DRAM 150 and page 50, which is in PMEM 160. In the second transaction, application "K" issued write requests targeting portions of page 2, which is in DRAM 150, and page 51, which is in PMEM 160.

New page numbers 184 correspond to pages located in PMEM 160 to which contents of pages were copied in response to write requests. As previously stated, upon receiving a write request, OS 114 copies contents of a target page to PMEM 160 and writes to the copy. For example, in the first transaction, contents of pages 0, 1, and 50 were copied to pages 52, 53, and 54, which are in PMEM 160, and then pages 52, 53, and 54 were written to according to the write requests. In the second transaction, contents of pages 2 and 51 were copied to pages 55 and 56, which are in PMEM 160, and then pages 55 and 56 were written to.

Released flags 186 indicate which pages of a transaction have been requested to be unlocked. Upon receiving an unlock request for a page, OS 114 marks the page as "released" by updating corresponding released flag 186. For example, in the first transaction, each of pages 0, 1, and 50 have been requested to be unlocked, as indicated by corresponding released flags 186 being set to 1. In the second transaction, neither page 2 nor page 51 has been requested to be unlocked, as indicated by corresponding released flags 186 being cleared.

Complete flags 188 indicate whether OS 114 has completed corresponding transactions, including updating page tables 152 and storage-to-PMEM table 164. For example, OS 114 has marked the first transaction as complete, as indicated by corresponding complete flag 188 being set to 1. However, OS 114 has not marked the second transaction as complete, as indicated by corresponding complete flag 188 being cleared.

Figure 2C:
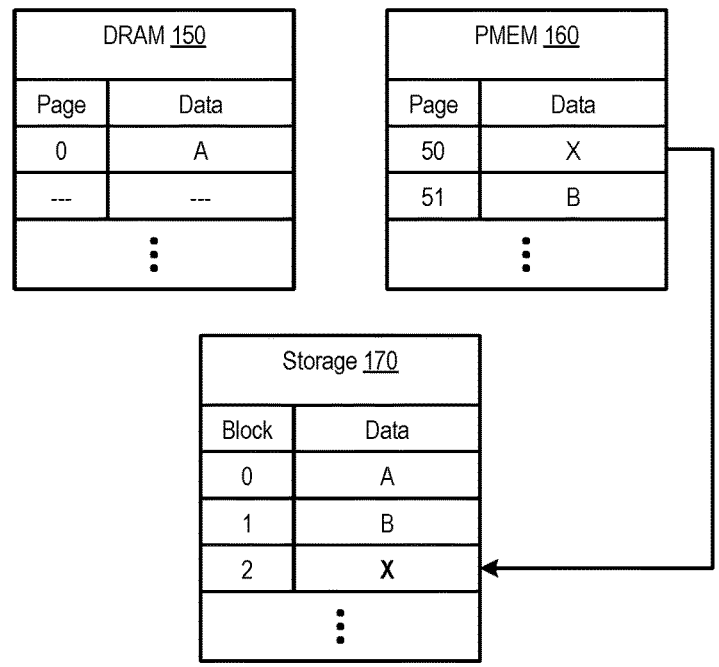

FIGS. 2A-2D are a sequence of system diagrams illustrating tiered memory system 140 and storage 170 as data is evicted from DRAM 150 to PMEM 160 and promoted from PMEM 160 to DRAM 150. FIG. 2A illustrates a time 0 at which, in DRAM 150, the contents of page 0 include some data "A," and the contents of page 1 include some data "B." Each of data "A" and "B" are backed by storage 170, which includes the data at blocks 0 and 1. In PMEM 160, the contents of page 50 include some data "X." However, the data "X" has not yet been persisted in storage 170, i.e., page 50 is "dirty." Storage 170 instead includes some data "W" at block 2, which is stale.

FIG. 2B illustrates a time 1 at which OS 114 has decided to evict the data at page 1, which is in DRAM 150, to PMEM 160. For example, OS 114 may have determined that the free space of DRAM 150 has fallen below a predetermined threshold. In response, OS 114 copies the data "B" from DRAM 150 to PMEM 160. As illustrated in FIG. 2B, the contents of page 1 are no longer stored by DRAM 150. However, the data "B" need not actually be deleted from DRAM 150. Instead, OS 114 may simply overwrite the data "B" in the future. Furthermore, after copying the data "B" to PMEM 160, OS 114 updates pages tables 152 to include a reference to page 51, which is in PMEM 160, instead of page 1. OS 114 also updates storage-to-PMEM table 164 to include a mapping from block 1 of storage 170 to the address of PMEM 160 at which page 51 is stored.

FIG. 2C illustrates a time 2 at which OS 114 has decided to promote the data at page 50, which is in PMEM 160, to DRAM 150. For example, OS 114 may have determined that OS 114 first backs up the data "X" to storage 170 so that the data "X" persists even after being deleted (or overwritten) in PMEM 160. OS 114 does so by overwriting the stale data "W."

Figure 2D:
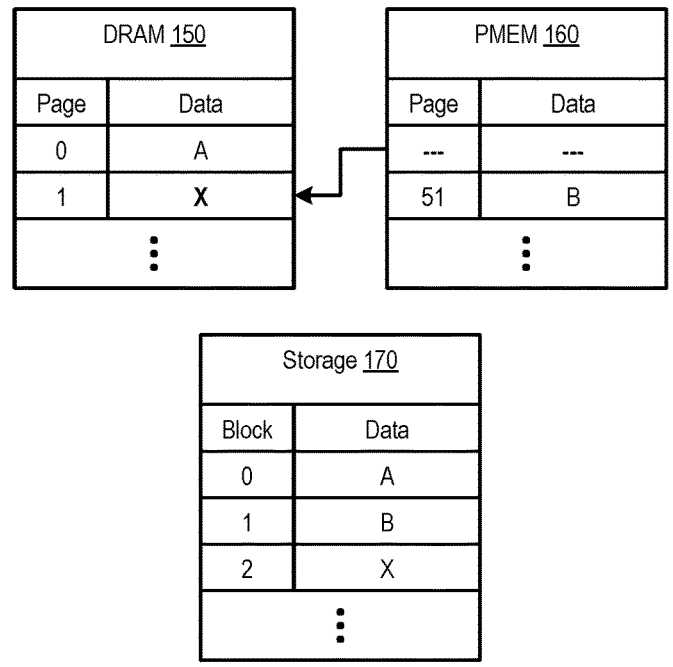

FIG. 2D illustrates a time 3 at which OS 114 completes the promotion of the data "X." OS 114 copies the data "X" from page 50 in PMEM 160 to DRAM 150. The data "X" is no longer persisted by PMEM 160, OS 114 eventually overwriting page 50 with other data. Furthermore, after copying the data "X" to DRAM 150, OS 114 updates pages tables 152 to include a reference to page 1, which is in DRAM 150, instead of page 50. OS 114 also deletes a mapping from block 2 of storage 170 to the address of PMEM 160 at which page 50 was stored, from storage-to-PMEM table 164.

Figures 3A, 3B, 3C:

FIGS. 3A-3E are a sequence of system diagrams illustrating tiered memory system 140 executing a write request directed to data in DRAM 150 and a write request directed to data in PMEM 160. FIG. 3A illustrates a time 0 at which, in DRAM 150, the contents of page 0 include some data "C," and the contents of page 1 include some data "DE." In PMEM 160, the contents of page 50 include some data "XY."

FIG. 3B illustrates a time 1 at which one of applications 112 issues a write request to write some data "F" to a portion of page 1, which is in DRAM 150. In response to the write request, OS 114 copies the contents of page 1 to PMEM 160 so that OS 114 can perform the write on the copy in PMEM 160 instead of on the contents of page 1.

FIG. 3C illustrates a time 2 at which OS 114 performs the write on the copy at page 51, which is in PMEM 160. OS 114 thus writes the data "F" to page 51, leaving the data "DE" at page 1 intact. For example, if the write request is part of a transaction that does not complete before host 100 crashes, the contents of page 51 can be disregarded. The data "DE," which should be persisted in storage 170 (not shown), remains intact. On the other hand, if the transaction completes, OS 114 eventually overwrites the data at the address of DRAM 150 at which page 1 is stored.

FIG. 3D illustrates a time 3 at which application 112 issues a write request to write some data "Z" to a portion of page 50, which is in PMEM 160. In response to the write request, OS 114 copies the contents of page 50 to an available page 52, which is also in PMEM 160, so that OS 114 can perform the write on the copy instead of on the contents of page 50.

FIG. 3E illustrates a time 4 at which OS 114 performs the write on the copy at page 52, which is in PMEM 160. OS 114 thus writes the data "Z" to page 52, leaving the data "XY" at page 50 intact.

Figure 4:
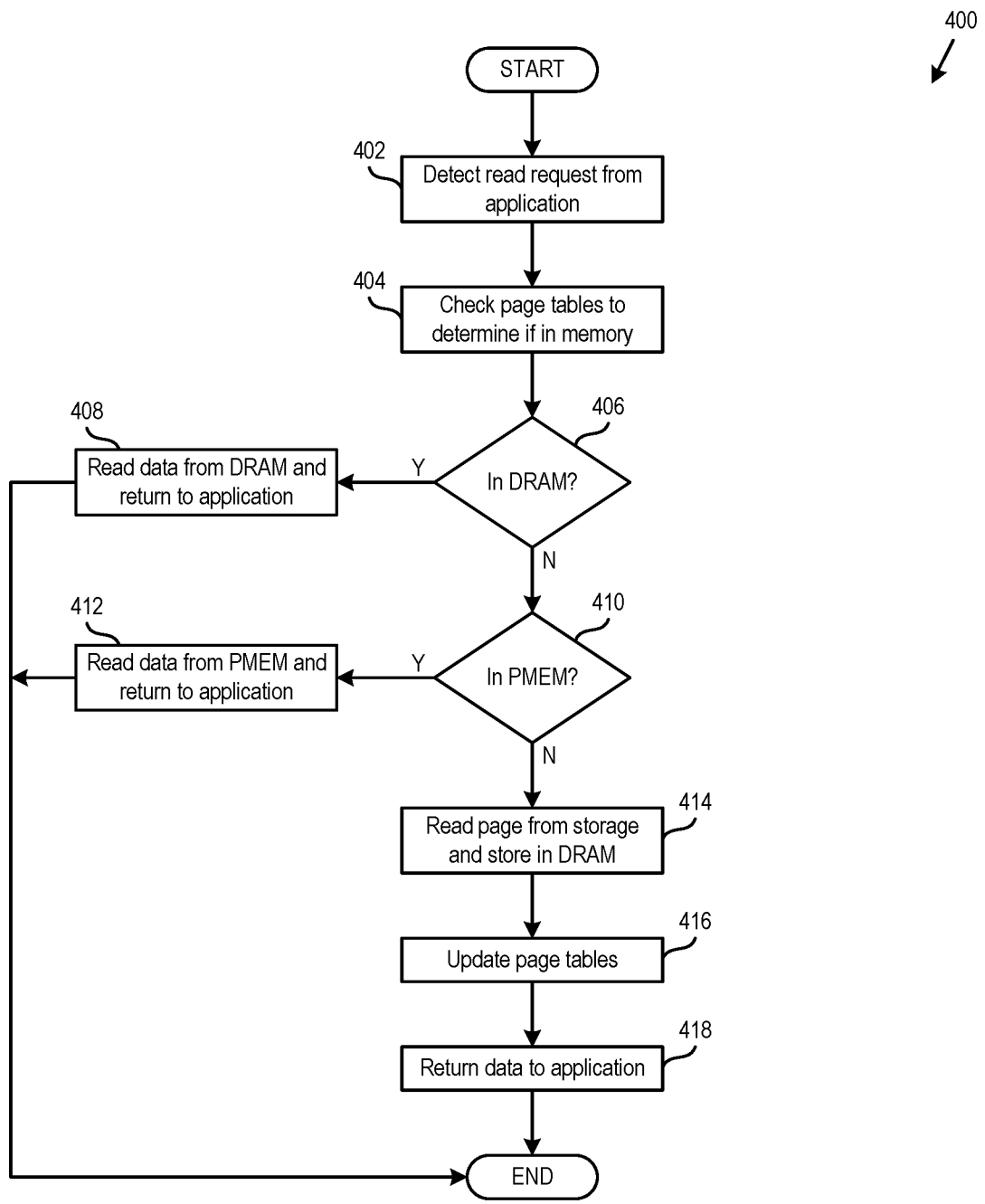
FIG. 4 is a flow diagram of steps carried out by an operating system of the host computing device to carry out a method of executing a read request, according to an embodiment.

FIG. 4 is a flow diagram of steps carried out by OS 114 to carry out a method 400 of executing a read request, according to an embodiment. At step 402, OS 114 detects a read request from one of applications 112, the read request including a target virtual address of application 112's virtual address space from which to read.

At step 404, OS 114 checks page tables 152 to determine if the data of the target virtual address is valid and present in either of DRAM 150 or PMEM 160. At step 406, if the data is valid and present in DRAM 150, method 400 moves to step 408. At step 408, OS 114 reads the data from DRAM 150 and returns the data to application 112, and method 400 ends. Otherwise, if the data is not valid and present in DRAM 150, after step 406, method 400 moves to step 410. At step 410, if the data is valid and present in PMEM 160, method 400 moves to step 412. At step 412, OS 114 reads the data from PMEM 160 and returns the data to application 112, and method 400 ends. Otherwise, if the data is not valid and present in PMEM 160, after step 410, method 400 moves to step 414.

At step 414, because the data is in neither DRAM 150 nor PMEM 160, there is a "page fault." In response to the page fault, OS 114 reads the data from a page of storage 170 and stores the page in DRAM 150. At step 416, OS 114 updates page tables 152 to include a reference to the page in DRAM 150. At step 418, OS 114 returns the data to application 112, and method 400 ends.

Figure 5:
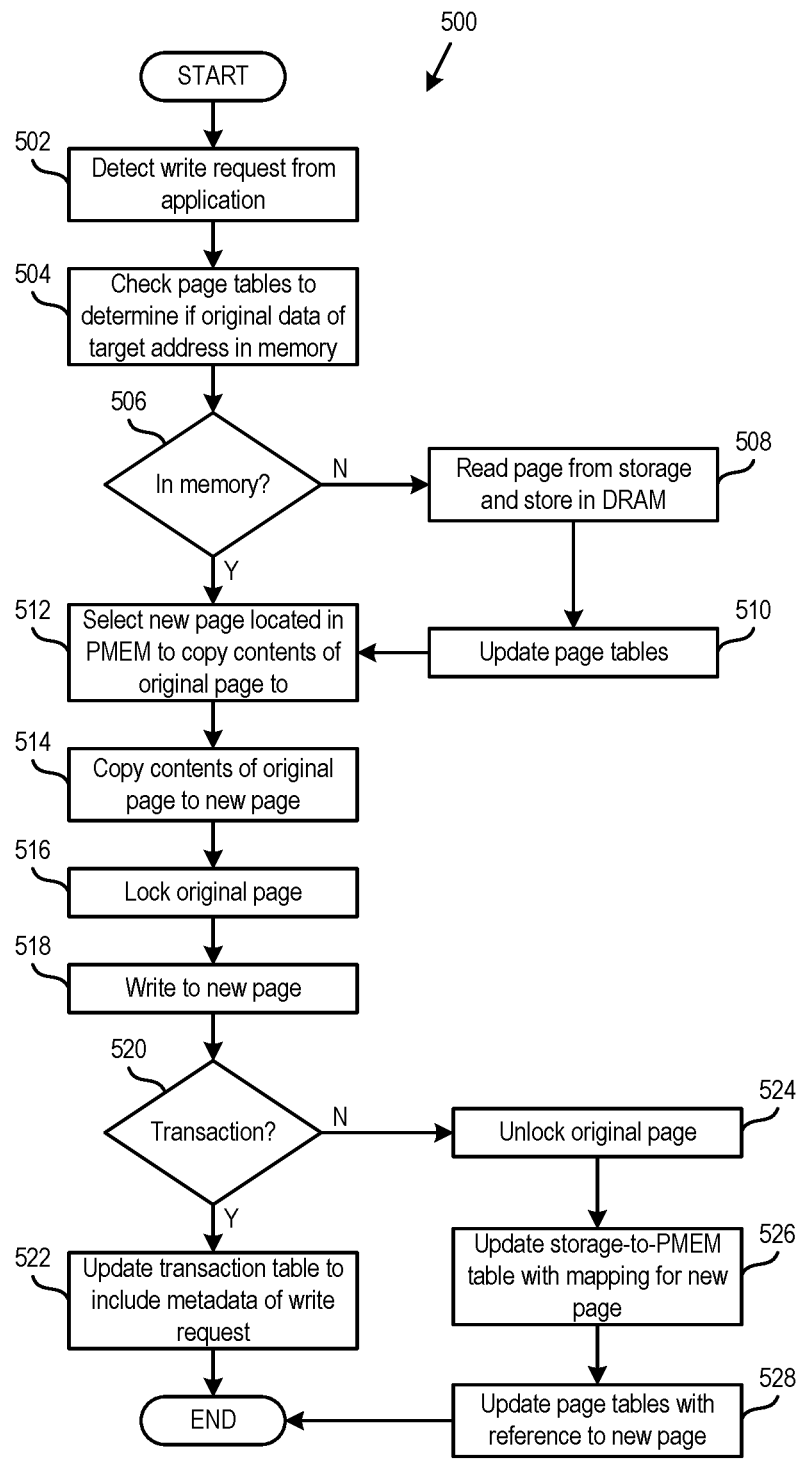
FIG. 5 is a flow diagram of steps carried out by the operating system to carry out a method of executing a write request, according to an embodiment.

FIG. 5 is a flow diagram of steps carried out by OS 114 to carry out a method 500 of executing a write request, according to an embodiment. At step 502, OS 114 detects a write request from one of applications 112, the write request including write data along with a target virtual address of application 112's virtual address space at which to write.

At step 504, OS 114 checks page tables 152 to determine if the data at the target virtual address, also referred to herein as the "original data," is valid and present in either of DRAM 150 or PMEM 160. At step 506, if the original data is valid and present in one of DRAM 150 and PMEM 160, method 500 moves to step 512. Otherwise, if the original data is not valid and present in either of DRAM 150 or PMEM 160, method 500 moves to step 508. At step 508, OS 114 reads the original data from a page of storage 170 and stores the page in DRAM 150. At step 510, OS 114 updates page tables 152 to include a reference to the page in DRAM 150.

At step 512, OS 114 selects a new page located in PMEM 160 to which OS 114 will copy the contents of the page storing the original data, also referred to herein as the "original page." At step 514, OS 114 copies the contents of the original page to the new page located in PMEM 160. At step 516, OS 114 locks the original page from read and write requests by setting corresponding lock flag 156 to 1.

At step 518, OS 114 writes the write data of the write request to the new page, the original data in the original page still being intact. At step 520, if the write request is part of a transaction, method 500 moves to step 522. Specifically, application 112 may have issued an instruction either separately or as part of the write request, the instruction indicating that the write request can be executed as a non-transaction. Otherwise, if OS 114 did not receive such a non-transaction instruction, OS 114 treats the write request as being part of a transaction.

At step 522, OS 114 updates transaction table 162 with metadata of the write request. If application 112 has an ongoing transaction, OS 114 appends the entry of the ongoing transaction by adding the page number of the original page to original page numbers 182, the page number of the new page to new page numbers 184, and a cleared flag to released flags 186. Otherwise, if application 112 does not have an ongoing transaction, OS 114 adds a new entry to transaction table 162 to start a new transaction. In the new entry, OS 114 adds the page number of the original page to original page numbers 182, the page number of the new page to new page numbers 184, and cleared flags to released flags 186 and complete flags 188. After step 522, method 500 ends.

Referring back to step 520, if the write request is not part of a transaction, method 500 moves to step 524, and OS 114 begins committing the write request of the non-transaction. At step 524, OS 114 unlocks the original page by clearing corresponding lock flag 156. At step 526, OS 114 updates storage-to-PMEM table 164 to include a mapping between an address of storage 170 and the new page in PMEM 160. At step 528, OS 114 updates page tables 152 to include a reference to the new page. After step 528, method 500 ends.

Figure 6:
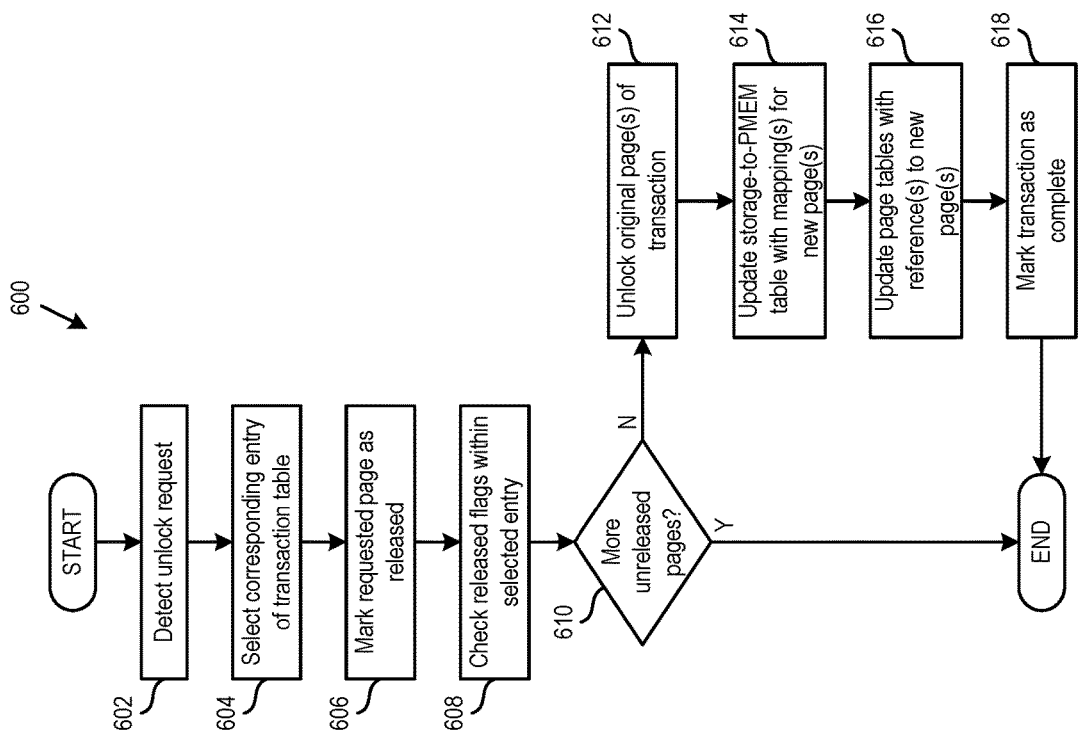
FIG. 6 is a flow diagram of steps carried out by the operating system to carry out a method of completing a transaction, according to an embodiment.

FIG. 6 is a flow diagram of steps carried out by OS 114 to carry out a method 600 of completing a transaction, according to an embodiment. At step 602, OS 114 detects an unlock request from application 112 for a page, the unlock request including the virtual address of the page to unlock. At step 604, OS 114 selects the entry of transaction table 162 that corresponds to application 112 and that includes the page requested to be unlocked within original page numbers 182. At step 606, OS 114 marks the requested page as released by setting corresponding released flag 186 to 1. After step 606, the page is still locked, but transaction table 162 now indicates that the page has been requested to be unlocked.

At step 608, OS 114 checks released flags 186 within the selected entry to determine if there are any remaining pages of the transaction that are unreleased, i.e., for which OS 114 has not yet detected an unlock request. At step 610, if there are any more unreleased pages, as indicated by any released flags 186 being cleared, method 600 ends. Otherwise, if each page of the transaction is released, as indicated by released flags 186 of the selected entry each being set to 1, method 600 moves to step 612. At step 612, OS 114 begins committing the write requests of the transaction by first unlocking each original page thereof. Specifically, OS 114 locates the original page(s) from original page numbers 182 and unlocks the page(s) by clearing the corresponding flag(s) from lock flags 156.

At step 614, OS 114 updates storage-to-PMEM table 164 to include a mapping(s) between an address(es) of storage 170 and each new page of the transaction in PMEM 160. At step 616, OS 114 updates page tables 152 to include a reference(s) to each new page of the transaction. At step 618, OS 114 marks the transaction as complete by setting corresponding complete flag 188 to 1. After step 618, method 600 ends.

Figure 7:
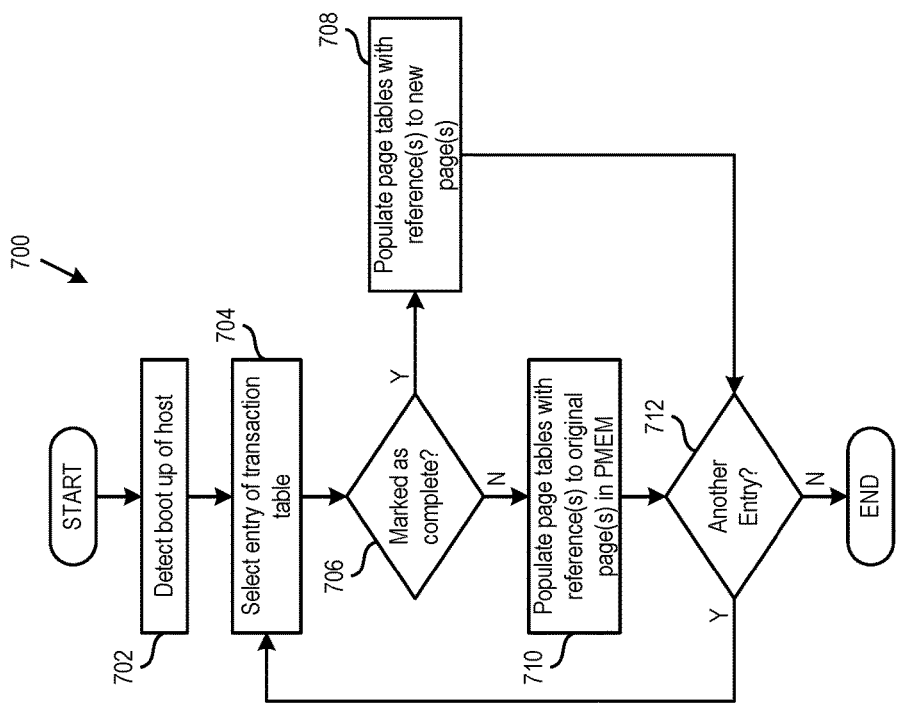
FIG. 7 is a flow diagram of steps carried out by the operating system to carry out a method of restoring PMEM to a consistent state after a boot up of the host, according to an embodiment.

FIG. 7 is a flow diagram of steps carried out by OS 114 to carry out a method 700 of restoring PMEM 160 to a consistent state after a boot up of host 100, according to an embodiment. At step 702, OS 114 detects boot up of host 100, which may have occurred after, e.g., a power outage or crash of host 100. At step 704, in response to detecting the boot up, OS 114 selects an entry of transaction table 162. At step 706, if the corresponding transaction is marked as complete, i.e., if corresponding complete flag 188 is set to 1, method 700 moves to step 708. At step 708, for the selected entry, OS 114 populates page tables 152 for application 112 corresponding to application ID 180, to include a reference(s) to each new page of the transaction.

Returning to step 706, if the corresponding transaction is not marked as complete, i.e., if complete flag 188 is cleared, method 700 moves to step 710. At step 710, for the selected entry, OS 114 populates page tables 152 for application 112 corresponding to application ID 180, to include a reference(s) to each original page of the transaction in PMEM 160. Any original pages that were in DRAM 150 before the boot up of host 100 are lost.

At step 712, if there is another entry of transaction table 162 to analyze, method 700 returns to step 704, and OS 114 selects another entry. Otherwise, if there are no more entries to analyze, method 700 ends, and PMEM 160 is in a consistent memory state. It should be noted that all pages in PMEM 160 are unlocked because lock flags 156 are lost upon reboot of host 100. Furthermore, if applications 112 issue read or write requests targeting pages for which page tables 152 were populated at steps 708 and 710, OS 112 performs the read or write requests based on references in page tables 152.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of writing to a tiered memory system of a computing device, wherein the tiered memory system includes both volatile memory and persistent memory (PMEM), the method comprising:
   in response to a first write request including first data to write to a first page located in the volatile memory:
      copying contents of the first page to a second page located in the PMEM;
      after copying the contents of the first page to the second page, writing the first data to the second page; and
      after writing the first data to the second page, updating a first mapping of the tiered memory system from referencing the first page to referencing the second page.

2. The method of claim 1, further comprising:
   in response to the first write request, locking the first page; and
   after writing the first data to the second page, in response to a first unlock request including an instruction to unlock the first page, unlocking the first page and updating the first mapping from referencing the first page to referencing the second page.

3. The method of claim 2, further comprising:
   in response to a second write request including second data to write to a third page located in the volatile memory, wherein the second write request is received prior to the first unlock request: locking the third page and copying contents of the third page to a fourth page located in the PMEM, and then writing the second data to the fourth page; and
   in response to the first unlock request and to a second unlock request including an instruction to unlock the third page: unlocking the first page and the third page, updating the first mapping from referencing the first page to referencing the second page, and updating a second mapping of the tiered memory system from referencing the third page to referencing the fourth page.

4. The method of claim 1, further comprising:
   in response to the first write request, storing in a table, a storage-to-PMEM mapping from an address of a storage device of the computing device to the second page.

5. The method of claim 4, further comprising:
   after a booting of the computing device that occurs after the updating of the storage-to-PMEM mapping, in response to a read request that includes an instruction to read contents of the second page, reading the contents of the second page from the PMEM, wherein the read contents of the second page include the first data.

6. The method of claim 1, further comprising:
   determining that a third page located in the PMEM is frequently accessed; and
   in response to determining that the third page is frequently accessed: copying contents of the third page to a storage device of the computing device and to a fourth page located in the volatile memory, and then updating a second mapping of the tiered memory system from referencing the third page to referencing the fourth page.

7. The method of claim 1, further comprising:
   determining that free space of the volatile memory has fallen below a predetermined threshold; and
   in response to determining that the free space has fallen below the predetermined threshold: copying contents of a third page located in the volatile memory to a fourth page located in the PMEM, and then updating a second mapping of the tiered memory system from referencing the third page to referencing the fourth page.

8. A non-transitory computer readable medium comprising instructions that are executable by a computing device, wherein the instructions when executed cause the computing device to carry out a method of writing to a tiered memory system of the computing device, wherein the tiered memory system includes both volatile memory and persistent memory (PMEM), and wherein the method comprises:
   in response to a first write request including first data to write to a first page located in the volatile memory:
      copying contents of the first page to a second page located in the PMEM;
      after copying the contents of the first page to the second page, writing the first data to the second page; and
      after writing the first data to the second page, updating a first mapping of the tiered memory system from referencing the first page to referencing the second page.

9. The non-transitory computer readable medium of claim 8, wherein the method further comprises:
   in response to the first write request, locking the first page; and
   after writing the first data to the second page, in response to a first unlock request including an instruction to unlock the first page, unlocking the first page and updating the first mapping from referencing the first page to referencing the second page.

10. The non-transitory computer readable medium of claim 9, wherein the method further comprises:
    in response to a second write request including second data to write to a third page located in the volatile memory, wherein the second write request is received prior to the first unlock request: locking the third page and copying contents of the third page to a fourth page located in the PMEM, and then writing the second data to the fourth page; and
    in response to the first unlock request and to a second unlock request including an instruction to unlock the third page: unlocking the first page and the third page, updating the first mapping from referencing the first page to referencing the second page, and updating a second mapping of the tiered memory system from referencing the third page to referencing the fourth page.

11. The non-transitory computer readable medium of claim 8, wherein the method further comprises:
    in response to the first write request, storing in a table, a storage-to-PMEM mapping from an address of a storage device of the computing device to the second page.

12. The non-transitory computer readable medium of claim 11, wherein the method further comprises:
after a booting of the computing device that occurs after the updating of the storage-to-PMEM mapping, in response to a read request that includes an instruction to read contents of the second page, reading the contents of the second page from the PMEM, wherein the read contents of the second page include the first data.

13. The non-transitory computer readable medium of claim 8, wherein the method further comprises:
determining that a third page located in the PMEM is frequently accessed; and
in response to determining that the third page is frequently accessed: copying contents of the third page to a storage device of the computing device and to a fourth page located in the volatile memory, and then updating a second mapping of the tiered memory system from referencing the third page to referencing the fourth page.

14. The non-transitory computer readable medium of claim 8, wherein the method further comprises:
determining that free space of the volatile memory has fallen below a predetermined threshold; and
in response to determining that the free space has fallen below the predetermined threshold: copying contents of a third page located in the volatile memory to a fourth page located in the PMEM, and then updating a second mapping of the tiered memory system from referencing the third page to referencing the fourth page.

15. A computing device comprising:
a tiered memory system including both volatile memory and persistent memory (PMEM); and
an operating system (OS) configured to execute on a hardware platform of the computing device to:
in response to a first write request including first data to write to a first page located in the volatile memory:
copy contents of the first page to a second page located in the PMEM;
after copying the contents of the first page to the second page, write the first data to the second paged; and
after writing the first data to the second page, update a first mapping of the tiered memory system from referencing the first page to referencing the second page.

16. The computing device of claim 15, wherein the OS is further configured to:
in response to the first write request, lock the first page; and
after writing the first data to the second page, in response to a first unlock request including an instruction to unlock the first page, unlock the first page and update the first mapping from referencing the first page to referencing the second page.

17. The computing device of claim 16, wherein the OS is further configured to:
in response to a second write request including second data to write to a third page located in the volatile memory, wherein the second write request is received prior to the first unlock request: lock the third page and copy contents of the third page to a fourth page located in the PMEM, and then write the second data to the fourth page; and
in response to the first unlock request and to a second unlock request including an instruction to unlock the third page: unlock the first page and the third page, update the first mapping from referencing the first page to referencing the second page, and update a second mapping of the tiered memory system from referencing the third page to referencing the fourth page.

18. The computing device of claim 15, further comprising:
a storage device, wherein the OS is further configured to:
in response to the first write request, store in a table, a storage-to-PMEM mapping from an address of the storage device to the second page.

19. The computing device of claim 18, wherein the OS is further configured to:
after a booting of the computing device that occurs after the OS updates the storage-to-PMEM mapping, in response to a read request that includes an instruction to read contents of the second page, read the contents of the second page from the PMEM, wherein the read contents of the second page include the first data.

20. The computing device of claim 15, further comprising:
a storage device, wherein the OS is further configured to:
determine that a third page located in the PMEM is frequently accessed; and
in response to determining that the third page is frequently accessed: copy contents of the third page to the storage device and to a fourth page located in the volatile memory, and then update a second mapping of the tiered memory system from referencing the third page to referencing the fourth page.

* * * * *